United States Patent
Loffink

(10) Patent No.: US 7,058,749 B2
(45) Date of Patent: Jun. 6, 2006

(54) SYSTEM AND METHOD FOR COMMUNICATIONS IN SERIAL ATTACHED SCSI STORAGE NETWORK

(75) Inventor: John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 10/712,151

(22) Filed: Nov. 13, 2003

(65) Prior Publication Data

US 2005/0108452 A1 May 19, 2005

(51) Int. Cl.
G06F 13/20 (2006.01)
(52) U.S. Cl. ...................................... 710/313
(58) Field of Classification Search ................ 710/313
See application file for complete search history.

(56) References Cited

U.S. PATENT DOCUMENTS

| | | | |
|---|---|---|---|
| 6,167,446 A | 12/2000 | Lister et al. | ................ 709/223 |
| 6,256,740 B1 | 7/2001 | Muller et al. | ................ 713/201 |
| 6,807,600 B1 * | 10/2004 | Bissessur et al. | ............ 710/313 |
| 2004/0015637 A1 * | 1/2004 | Yau | ............................ 710/313 |

FOREIGN PATENT DOCUMENTS

| WO | WO1994/12926 A1 | 12/1992 |
|---|---|---|
| WO | WO2004/095287 A2 | 1/2004 |

OTHER PUBLICATIONS

Robert Shefield, SAS1-r00-Working Draft Serial Attached SCSI, revision 0, Aug. 8, 2003, Intel.*
Rob Elliott, Serial Attached SCSI Link Layer—part 2, Sep. 30, 2003, Hp.*

* cited by examiner

Primary Examiner—Rehana Perveen
Assistant Examiner—Christopher Daley
(74) Attorney, Agent, or Firm—Baker Botts L.L.P.

(57) ABSTRACT

A network topology and bridge device is disclosed for a Serial Attached SCSI storage network. The bridge devices is coupled between each Serial ATA drive of the network and the remainder of the elements of the storage network and translates storage transactions between the Serial ATA drive and the remainder of the Serial Attached SCSI storage network.

20 Claims, 2 Drawing Sheets

SYSTEM AND METHOD FOR COMMUNICATIONS IN SERIAL ATTACHED SCSI STORAGE NETWORK

TECHNICAL FIELD

The present disclosure relates generally to the field of computer networks, and, more particularly, to a Serial Attached SCSI storage network.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be included as elements of a storage network. A storage network can be considered as a specialized network of storage devices coupled to one or more data servers. Serial Attached SCSCI (SAS) is a storage network interface and communications protocol for storage transactions. Serial Attached SCSI is characterized by storage networks having a serial, point-to-point architecture and improved data integrity, as compared with parallel SCSI storage networks. Because data transfer in a Serial Attached SCSI network occurs on a serial basis, data transfer rates for Serial Attached SCSI are faster than data transfer rates associated with parallel data transfer architectures. Both SAS storage devices and Serial ATA (SATA) storage devices may be physically coupled as storage endpoints in a Serial Attached SCSI storage network. SAS drives include dual ports. In contrast, Serial ATA drives include a single port. The dual port functionality of an SAS drive supports failover protocols in the storage network because of the ability to connect the SAS drive to multiple edge expanders in the Serial Attached SCSI network. Despite having only a single port, Serial ATA drives are sometimes preferred over SAS drives because of the relative cost of Serial ATA drives as compared with SAS drives.

The Serial Attached SCSI provides for communication with Serial ATA drives through the Serial ATA Tunneling Protocol. As with most tunneling constructs in communications protocols, the Serial ATA Tunneling Protocol provides for the placement of Serial ATA commands and data within Serial Attached SCSI communications. Serial ATA Tunneling Protocol does not, however, support the use of dual paths to a single Serial ATA drive. Despite the support for Serial ATA drives in Serial Attached SCSI networks, the functionality of a Serial Attached SCSI storage network with one or more Serial ATA drives is diminished by the inability of the Serial ATA drive to support dual port communications.

SUMMARY

In accordance with the present disclosure, a network topology and bridge device is disclosed for a Serial Attached SCSI storage network. The bridge device includes at least two input ports and an output port. The input ports of the bridge device are coupled to expander devices of the storage network, and the output port is coupled to a Serial ATA drive. The bridge device translates communications from the Serial Attached SCSI protocol to the Serial ATA protocol, and from the Serial ATA protocol to the Serial Attached SCSI protocol. The bridge device includes an arbiter that manages the flow of serial data from the input ports to the translation node and from the translation node to the input ports.

A technical advantage of the present disclosure is a Serial Attached SCSI storage network in which dual communication paths are provided to each Serial ATA drive. A bridge device is interposed at the input of each Serial ATA drive and presents two paths for communicating with the Serial ATA drive, thereby permitting communication with the Serial ATA drive in the event of an operational failure at a component of the storage network that is upstream of the bridge device. Another technical advantage of the present disclosure is a network topology for deployment in a Serial Attached SCSI network that makes use of economical Serial ATA drives without compromising the robustness and failover capabilities typically associated with Serial Attached SCSI networks populated with SAS drives. At present, Serial ATA drives are less costly than comparable SAS drives. The network topology disclosed herein permits the use of Serial ATA drives while also taking advantage in a Serial Attached SCSI storage network of failover capabilities typically associated with SAS drives. Another technical advantage of the present disclosure is the bridge device disclosed herein provides the advantage of redundancy and relative costs on a transparent basis with reference to the operation of the Serial ATA drive. The operation of the Serial ATA drive is not affected by the interposition of a bridge device at the port of each Serial ATA drive. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
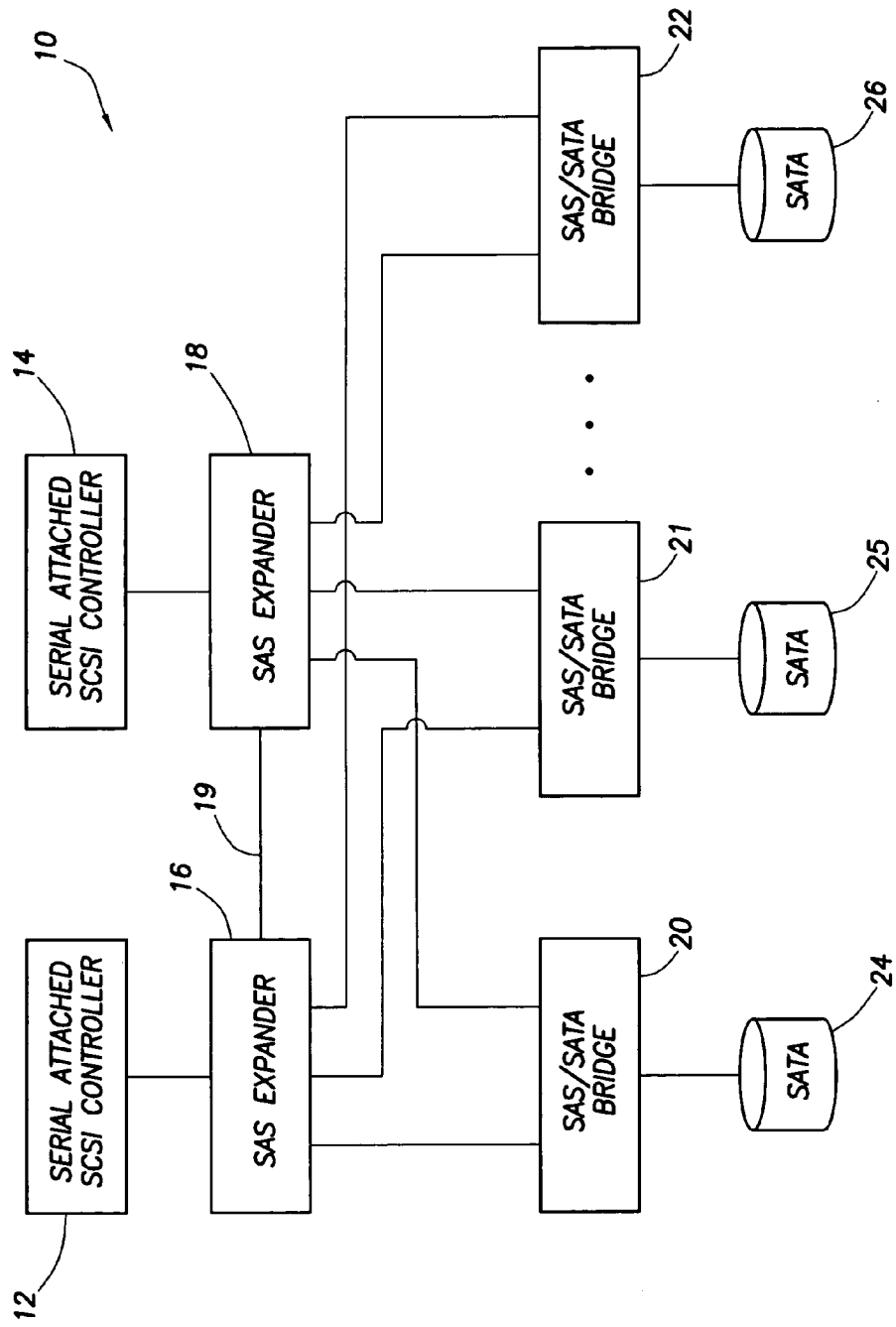
FIG. 1 is a network diagram of a Serial Attached SCSI storage network.

FIG. 1 is a network diagram of a Serial Attached SCSI storage network, which is indicated generally at 10. Storage network 10 includes Serial Attached SCSI controllers 12 and 14. Controllers 12 and 14 are SAS initiators or host devices. Each SAS controller is coupled to an SAS fanout or expander device. In the example of FIG. 1, SAS controller 12 is coupled to SAS expander device 16, and SAS controller 14 is coupled to SAS expander device 18. SAS expander devices 16 and 18 are coupled to one another through communications link 19. Storage network 10 includes a number of SAS/SATA bridge devices. In the example of FIG. 10, each of SAS expander devices 16 and 18 is coupled to SAS/SATA bridge 20, SAS/SATA bridge 21, and SAS/SATA bridge 22. As shown in FIG. 1, each SAS/SATA bridge includes dual input ports and a single output port that is coupled to a Serial ATA drive. In the example of FIG. 1, SAS/SATA bridge 20 is coupled to Serial ATA Drive 24; SAS/SATA bridge 21 is coupled to Serial ATA drive 25; and SAS/SATA bridge 22 is coupled to Serial ATA Drive 26.

As is common in a Serial Attached SCSI topology, each SAS initiator is coupled to one SAS expander, and each SAS expander is coupled to multiple storage drives. In the topology of FIG. 1, however, an SAS/SATA bridge is interposed between each SAS expander device and each Serial ATA drive. A single SAS/SATA bridge device is associated with each Serial ATA drive. An expander device or router operates to route a communication from the controller to one of several storage drives in the storage network. In the example of FIG. 1, each expander device is coupled to a single SCSI controller and to several SAS/SATA bridges. Each expander device could also be coupled to one or more SAS drives.

Figure 2:
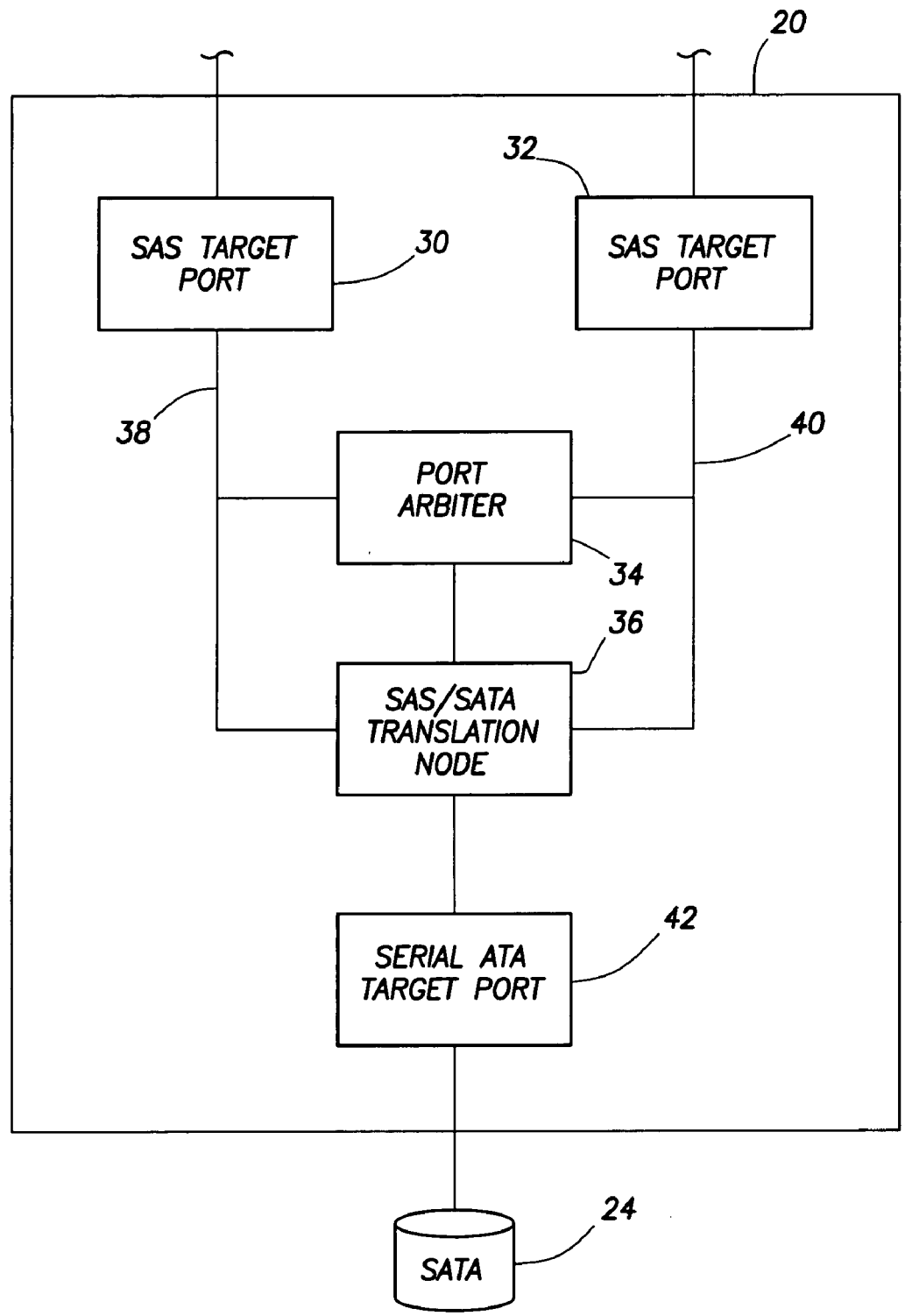
FIG. 2 is a functional block diagram of an SAS/SATA bridge.

A diagram of each SAS/SATA bridge 20 and Serial ATA drive 24 of FIG. 1 is shown in FIG. 2. The diagram of SAS/SATA bridge 20 of FIG. 2 is representative of the other SAS/SATA bridge of FIG. 1. SAS/SATA bridge 20 includes dual ports, which are identified as SAS target port 30 and SAS target port 32. Each port is coupled to a single SAS expander device, as shown in the network diagram of FIG. 1. Each target port of the SAS/SATA bridge 20 is coupled to an SAS port arbiter 34 and SAS/SATA translation node 36. Port arbiter 34 governs the communications links 38 and 40 between each of the target ports and SAS/SATA translation node 36. Port arbiter 34 arbitrates between the data transmitted on communications link 38 and the data between transmitted on communications link 40 for access to SAS/SATA translation node 36. Port arbiter 34 manages the flow of serial data into the SAS/SATA translation node 36 such that only a single stream of data is being translated at the SAS/SATA translation node. A buffer may be employed to store data associated with the SAS target port that is temporarily prevented from communicating with the SAS/SATA translation node.

Following the Serial ATA Tunneling Protocol, the SAS/SATA translation node 36 translates serial data received at node 36 from the Serial Attached SCSI communications protocol into the Serial ATA communications protocol. The result of this translation is provided to Serial ATA target port 42, which serves as a single output port that couples SAS/SATA bridge 20 to the associated Serial ATA drive 44. From the perspective of the attached Serial ATA drive, the attached Serial ATA drive 44 is coupled to the network through a single port. From the perspective of the remainder of the network, access to the Serial ATA drive 44 can be accomplished through one of two input ports to bridge 20. Because the Serial ATA drive 44 of FIG. 2 can be accessed through one of two input ports to bridge 20, the Serial ATA drive 44 can still be accessed even if one of the paths to an input port of bridge 20 has failed. As such, the Serial ATA drive 44 in FIG. 2 is not isolated on a single path and thereby susceptible to any communications failure within that path.

Communications from Serial ATA drive 44 are transmitted to SAS/SATA translation node 36, where the serial data is translated from the Serial ATA communications protocol to a Serial Attached SCSI communications protocol. Port arbiter 34 directs the translated serial data to communications link 38 for communication to SAS target port 30 or to communications link 40 for communication to SAS target port 32. Port arbiter 34 directs upstream communications from Serial ATA drive 44 to SAS target port 30 or SAS target port 32 according to the Serial Attached SCSI controller that is addressed to receive the serial data from the Serial ATA drive. Port arbiter 34 thus directs the serial data communication to an SAS target port that is coupled to an SAS expander device that can direct the communication to the targeted Serial Attached SCSI controller.

The communications network and method disclosed herein provides a Serial Attached SCSI storage network that is able to support the cost-effective use of Serial ATA drives in a manner that is error tolerant. Through the use of an SAS/SATA bridge, access to Serial ATA drives of the storage network can be accomplished on dual-port basis. The SAS/SATA bridge disclosed herein has dual input port, each of which is coupled to an SAS expander device. Because the each Serial ATA drive can be accessed through one of two expander devices, the access to the Serial ATA drives of the storage network is more fault tolerant, as the failure of a single SAS expander device in the communications path of the Serial ATA device will not disable access to the Serial ATA device. The network topology and method disclosed herein is transparent to the operation of a Serial Attached SCSI storage network. From the perspective of the Serial Attached SCSI controller and the expander device, the storage network includes two paths or ports to the Serial ATA drive. From the perspective of the Serial ATA drive, the serial ATA drive has only a single port. Although the present disclosure has been described in detail, it should be understood that various changes, substitutions, and alterations can be made hereto without departing from the spirit and the scope of the invention as defined by the appended claims.

What is claimed is:

1. A storage network, comprising:
multiple SCSI controllers;
an expander device coupled to each controller;
at least one bridge device, wherein each bridge device is coupled to a plurality of expander devices;

wherein each bridge device is operable to translate serial data from the Serial Attached SCSI protocol to serial data in the Serial ATA protocol; and at least one Serial ATA drive, wherein each Serial ATA drive is coupled to an output port of the bridge device.

2. The storage network of claim 1, wherein the bridge device is operable to translate serial data communications from the Serial Attached SCSI protocol to the Serial ATA protocol.

3. The storage network of claim 2, wherein the serial data communications in the Serial Attached SCSI protocol include serial data formatted according to the Serial ATA Tunneling protocol.

4. The storage network of claim 2, wherein each bridge device is operable to arbitrate between data streams such that the Serial ATA drive coupled to the bridge drive receives, at any one time, only one data stream.

5. The storage network of claim 2, wherein each bridge device is operable to route communications from the Serial ATA drive to an expander device that is associated with the SCSI controller to whom the communication from the Serial ATA drive is directed.

6. The storage network of claim 2, wherein the serial data communications in the Serial Attached SCSI protocol include serial data formatted according to the Serial ATA Tunneling protocol; and wherein each bridge device is operable to arbitrate between data streams such that the Serial ATA drive coupled to the bridge drive receives, at any one time, only one data stream.

7. The storage network of claim 2, wherein the serial data communications in the Serial Attached SCSI protocol include serial data formatted according to the Serial ATA Tunneling protocol;

wherein each bridge device is operable to arbitrate between data streams such that the Serial ATA drive coupled to the bridge drive receives, at any one time, only one data stream;

wherein each bridge device is operable to arbitrate between data streams such that the Serial ATA drive coupled to the bridge drive receives, at any one time, only one data stream; and wherein each bridge device is operable to route communications from the Serial ATA drive to an expander device that is associated with the SCSI controller to whom the communication from the Serial ATA drive is directed.

8. The storage network of claim 1, wherein each bridge device is associated with a single Serial ATA drive.

9. A method for translating data directed to a Serial ATA drive in a Serial Attached SCSI storage network, comprising the steps of:

providing a bridge device interposed at the input port of the serial ATA drive, the bridge device comprising:

a plurality of input ports coupled to other elements of the storage network and operable to receive data in Serial Attached SCSI protocol;

a translation node operable to translate the data from the Serial Attached SCSI protocol to the Serial ATA protocol; and an output port coupled to the Serial ATA drive.

10. The method for translating data directed to a Serial ATA drive in a Serial Attached SCSI network of claim 9, wherein the data in the Serial Attached SCSI protocol is transmitted in the Serial ATA Tunneling Protocol.

11. The method for translating data directed to a Serial ATA drive in a Serial Attached SCSI network of claim 9, wherein the bridge device is coupled between multiple expander devices and a Serial ATA drive such that each input port is coupled to an expander device.

12. The method for translating data directed to a Serial ATA drive in a Serial Attached SCSI network of claim 11, wherein the provided bridge device further comprises a arbiter node operable to manage the flow of data in the Serial Attached SCSI protocol to the translation node.

13. The method for translating data directed to a Serial ATA drive in a Serial Attached SCSI network of claim 11, wherein the arbiter node is operable to route communications from the Serial ATA drive coupled to the output node of the bridge device to an expander device associated with a SCSI controller to whom the communication is directed.

14. A bridge device for coupling elements of a Serial Attached SCSI network to a Serial ATA drive, comprising:

multiple input ports, each operable to receive communications routed through separate expander devices;

an output port coupled to a Serial ATA drive; and a translation node operable to translate serial data in the Serial Attached SCSI protocol to serial data in the Serial ATA protocol.

15. The bridge device of claim 14, wherein the bridge device is associated with a single Serial ATA drive.

16. The bridge device of claim 15, wherein the bridge device is coupled to at least two expander devices; and wherein each expander device is associated with a single SCSI controller.

17. The bridge device of claim 16, further comprising an arbiter for managing flow of data from each of the input ports such that only a single stream of serial data is being translated at any one time at the translation node.

18. The bridge device of claim 16, further comprising an arbiter for managing the flow of serial data from the Serial ATA drive such that data is directed from the translation node to an input port associated with an expander device that is operable to route the serial data to the SCSI controller to whom the serial data is directed.

19. The bridge device of claim 16, further comprising an arbiter operable to, manage the flow of data from each of the input ports such that only a single stream of serial data is being translated at any one time at the translation node; and manage the flow of serial data from the Serial ATA drive such that data is directed from the translation node to an input port associated with an expander device that is operable to route the serial data to the SCSI controller to whom the serial data is directed.

20. The bridge device of claim 14, wherein the translation node is operable to translate data in the Serial ATA Tunneling Protocol.

* * * * *